(12) United States Patent
Yun et al.

(10) Patent No.: US 8,191,149 B2
(45) Date of Patent: May 29, 2012

(54) SYSTEM AND METHOD FOR PREDICTING CYBER THREAT

(75) Inventors: Joo Beom Yun, Daejeon (KR); Seung Hyun Paek, Daejeon (KR); In Sung Park, Daejeon (KR); Eun Young Lee, Daejeon (KR); Hyung Geun Oh, Daejeon (KR); Do Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 926 days.

(21) Appl. No.: 11/938,356

(22) Filed: Nov. 12, 2007

(65) Prior Publication Data

US 2008/0115221 A1 May 15, 2008

(30) Foreign Application Priority Data

Nov. 13, 2006 (KR) .................. 10-2006-0111864
May 3, 2007 (KR) .................. 10-2007-0043081

(51) Int. Cl.
*G06F 12/14* (2006.01)
(52) U.S. Cl. ........................................... 726/25
(58) Field of Classification Search .......... 726/22, 726/23, 25
See application file for complete search history.

(56) References Cited

U.S. PATENT DOCUMENTS

| | | | |
|---|---|---|---|
| 2002/0066034 A1* | 5/2002 | Schlossberg et al. | 713/201 |
| 2005/0193430 A1* | 9/2005 | Cohen et al. | 726/25 |
| 2006/0031938 A1* | 2/2006 | Choi | 726/25 |
| 2006/0117388 A1* | 6/2006 | Nelson et al. | 726/25 |
| 2007/0169194 A1* | 7/2007 | Church et al. | 726/23 |

FOREIGN PATENT DOCUMENTS

| | | |
|---|---|---|
| KR | 1020000012272 A | 3/2000 |
| KR | 1020040035572 A | 4/2004 |
| KR | 100625096 | 9/2006 |

OTHER PUBLICATIONS

The future of netcrime now: Part 1—threats and challenges by Sheridan Morris, published in Dec. 2004, Published by Home Office 20 pages.*
Alexander D. Korzyk, Sr., et al; "A Forecasting Model for Internet Security Attacks;" csrc nist.gov/nissc/1998proceedings/paperD5.pdf.
Hae-Kyeong Kim, et al; "Theory of Time-Series Analysis and Prediction", Kyeongmun Co., Aug. 5, 2003, pp. 61-81, 83, 87 and 92.
Jong-Seong Lee, et al; "The Delphi Method", Gyoyukgwahak Co., Feb. 15, 2001, pp. 23-25.

* cited by examiner

*Primary Examiner* — Ellen Tran
(74) *Attorney, Agent, or Firm* — Ladas & Parry LLP

(57) ABSTRACT

Provided are a system and method for predicting a cyber threat. The system and method collect various variables and synthetically predict the frequency, dangerousness, possibility, and time of the occurrence of a cyber threat including hacking, a worm/virus, a Denial of Service (DoS) attack, illegal system access, a malicious code, a social engineering attack, system/data falsification, cyber terror/war, weakness exploitation, etc., using a time-series analysis method and a Delphi method, and inform a user in advance of the prediction result, thereby enabling the user to prepare against the cyber threat.

20 Claims, 3 Drawing Sheets

SYSTEM AND METHOD FOR PREDICTING CYBER THREAT

CROSS-REFERENCE TO RELATED APPLICATION

This application claims priority to and the benefit of Korean Patent Application Nos. 2006-111864, filed Nov. 13, 2006, and 2007-43081, filed May 3, 2007, the disclosure of which is incorporated herein by reference in its entirety.

BACKGROUND

1. Field of the Invention

The present invention relates to a system and method for predicting a cyber threat, and more particularly, to a system and method for collecting various pieces of information, such as Internet security site notice information, network traffic flow information, infringement (hacking) occurrence information, intrusion detection event information, expert-opinion information, etc., generating time-series data and quantitative data, and predicting the frequency, dangerousness, possibility, and time of the occurrence of a cyber threat including hacking, a worm/virus, a Denial of Service (DoS) attack, illegal system access, a malicious code, a social engineering attack, system/data falsification, cyber terror/war, weakness exploitation, etc., to a user using the optimum one of a time-series models and a Delphi method on the data.

2. Discussion of Related Art

Recently, with the rapid development of information and communication technology like the Internet, cyber threats such as computer hacking, viruses, worms, Trojan horses, etc., are increasing. Although there are Intrusion Detection Systems (IDSs), Intrusion Prevention Systems (IPSs), monitoring and control systems, Enterprise Security Management (ESM) systems, etc., to manage and protect against such cyber threats, the systems merely detect a present attack and provide only present network status information. However, since the information is past-use, it is difficult to prevent a threat or enable an administrator or a user to sufficiently cope with a cyber threat.

Therefore, if information on a hacking trend or degree of a cyber threat in the near future was informed in advance to a computer user, akin to a weather forecast, it would help the user to prepare for and cope with a cyber threat. Currently, there exist technologies for network intrusion detection and prevention, network control, ESM, early warning of a cyber threat, etc., but there has not been yet any technology to predict and inform in advance of a cyber threat.

SUMMARY OF THE INVENTION

The present invention is directed to a system and method for predicting the frequency, dangerousness, possibility, and time of the occurrence of a cyber threat, including a worm/virus, a Denial of Service (DoS) attack, illegal system access, a malicious code, a social engineering attack, system/data falsification, cyber terror/war, weakness exploitation, etc., using a time-series analysis method and a Delphi method on time series data and quantitative data collected and processed in collective consideration of various variables, informing in advance the prediction result to a user, and thereby enabling the user to prepare against a cyber threat.

One aspect of the present invention provides a system for predicting a cyber threat, which provides prediction information on the cyber threat and allows a user to prepare against the cyber threat, the system comprising: an information collection/processing module for collecting and processing at least one of information on an intrusion detection event, statistical information on network traffic, cyber threat information of an Internet bulletin board, expert-opinion information on an occurrence of the cyber threat; a prediction engine sub-system for predicting a frequency, possibility and time of the occurrence of the cyber threat using a time-series analysis method or a Delphi method according to the processed information; a database (DB) management module for storing and managing the processed information and the prediction result of the prediction engine sub-system; and a result display graphic user interface (GUI)/management module for displaying the prediction result of the prediction engine sub-system on a screen, and changing and managing configurations of the prediction engine sub-system and the information collection/processing module.

Another aspect of the present invention provides a method of predicting a cyber threat, which provides prediction information on the cyber threat including at least one of hacking, a worm/virus, a DoS attack, illegal system access, a malicious code, a social engineering attack, system/data falsification, cyber terror/war, and weakness exploitation and allows a user to prepare against the cyber threat, the method comprising the steps of: (a) collecting cyber threat information required for predicting the cyber threat; (b) processing the collected cyber threat information into time-series data and quantitative data, and storing the time-series data and the quantitative data; (c) predicting information on an occurrence of the cyber threat using an optimum one of a time-series models and a Delphi method according to a type of the cyber threat; and (d) storing the prediction result and providing the stored prediction result using a graph or text according to the user's request.

The system and method for predicting a cyber threat according to the present invention synthetically employ a Delphi method, which is a method of collecting predictive opinions of experts, as well as a time-series analysis method on the basis of various pieces of collected information including monitoring system information, expert-opinion information, etc., and perform an optimum model according to the type of a cyber threat to be predicted during operation, thereby continuously predicting a cyber threat.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

A system and method for predicting a cyber threat according to the present invention are based on the assumption that result data of a network sensor and an Intrusion Detection System (IDS) has been previously stored in a monitoring system database (DB). In addition, the prediction result of the system for predicting a cyber threat is provided as a range of a value rather than the value due to the uncertainty of the future.

Figure 1:
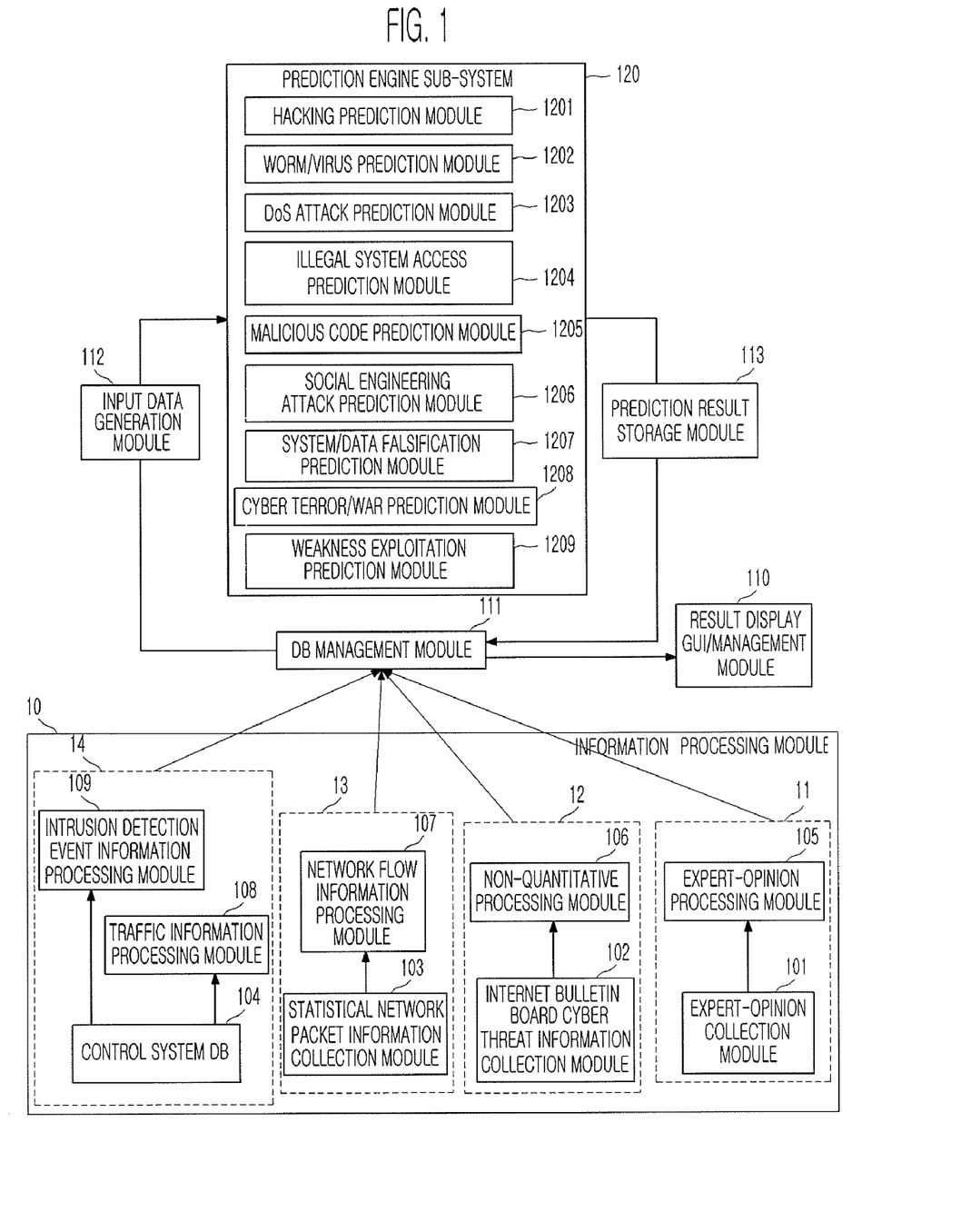
FIG. 1 is a block diagram of a system for predicting a cyber threat according to an exemplary embodiment of the present invention.

FIG. 1 is a block diagram of a system for predicting a cyber threat according to an exemplary embodiment of the present invention.

Referring to FIG. 1, the system for predicting a cyber threat comprises an information collection/processing module 10, a DB management module 111, a prediction engine sub-system 120, and a result display graphic user interface (GUI)/management module 110. The information collection/processing module 10 collects and processes various pieces of information including monitoring system information, expert-opinion information, etc. The DB management module 111 stores and manages the processed information and prediction result. The prediction engine sub-system 120 applies a time-series analysis method and a method of collecting predictive opinions of experts, i.e., a Delphi method, to the processed information, thereby predicting the frequency, dangerousness, possibility, and time of the occurrence of a cyber threat. The result display GUI/management module 110 displays the prediction result, and changes or manages the configurations of the prediction engine sub-system 120 and the information collection/processing module 10.

The information collection/processing module 10 includes: modules 13 and 14 for collecting information on an intrusion detection event, statistical information on network traffic and statistical information on network packets obtained by a monitoring system, an IDS and a network sensor, processing the collected information into time-series data on the periodic frequency of occurrence, and storing the time-series data in the DB management module 111; a module 12 for collecting articles on a cyber threat from an Internet bulletin board, filtering the articles using a keyword, and storing the filtered articles in the DB management module 111; and a module 11 for collecting and quantifying opinions of information security experts and storing the quantified opinions in the DB management module 111.

Among the information collected by the respective modules 11 to 14, the intrusion detection event information is stored as time-series data on the frequency of occurrence in units of day, the statistical network traffic information is stored for a predetermined time period, e.g., 5 minutes, 10 minutes, etc., according to traffic flows, i.e., packets having the same source IP (Internet protocol) address, destination IP address, source port and destination port. In addition, the articles relating to a cyber threat on an Internet bulletin board, for example, worm/virus information, is stored in the form of a worm/virus table, i.e., a worm/virus name, an occurrence time, the name of a collection site, dangerousness, a description on the worm/virus, etc., and the expert-opinion information is stored in the form of an expert-opinion information table, i.e., an expert's name, an expert's weight, an answer to the first question, an answer to the second question, . . . , an answer to the n-th question (n being a natural number).

The respective modules 11 to 14 of the information collection/processing module 10 will be described in detail below. A traffic information processing module 108 collects statistical information on network traffic from a monitoring system DB 104 and stores the collected information in the DB management module 111 according to network flows, i.e., packets having the same source IP, destination IP, source port and destination port. An intrusion detection event information processing module 109 collects intrusion detection event information from the monitoring system DB 104, processes the collected information into time-series data, and then stores the data in the DB management module 111.

A statistical network packet information collection module 103 collects statistical network packet information, and a network flow information processing module 107 processes the entire collected statistical network packet information into time-series data and stores the data in the DB management module 111.

An Internet bulletin board cyber threat information collection module 102 filters articles relating to cyber threat information of a predetermined Internet bulletin board using a keyword to collect only specific information in the form of a table. A non-quantitative information processing module 106 quantifies and stores the filtered specific information in the DB management module 111.

An expert-opinion collection module 101 requests information security experts for an answer to an objective question rather than a subjective question with respect to the possibility of the occurrence of cyber terror/war or the possibility and time of the occurrence of weakness exploitation, thereby collecting expert opinions. An expert-opinion processing module 105 quantifies and stores the collected expert opinions in the DB management module 111.

For example, by showing 5-choice questions with respect to the possibility and time of the occurrence of a cyber threat, receiving answers to the questions from information security experts, and storing the selected number of each answer, the prediction engine sub-system 120 determines the most selected answer as a prediction value.

Here, quantification indicates a process of quantifying qualitative information. For example, the dangerousness of a worm/virus threat classified as qualitative information, e.g., very high, high, moderate, low and very low, may be quantified, e.g., very high is 5, high is 4, moderate is 3, low is 2, and very low is 1.

The DB management module 111 stores the processed time-series data and quantitative data transferred from the processing modules 105 to 109 and the prediction result data of the prediction engine sub-system 120, and supports data retrieval. An input data generation module 112 provides the processed time-series data and quantitative data to the prediction engine sub-system 120, and a prediction result storage module 113 stores the prediction result data in the DB management module 111.

The prediction engine sub-system 120 actually performing prediction includes a hacking prediction module 1201, a worm/virus prediction module 1202, a Denial of Service (DoS) attack prediction module 1203, an illegal system access prediction module 1204, a malicious code prediction module 1205, a social engineering attack prediction module 1206, a system/data falsification prediction module 1207, a cyber terror/war prediction module 1208, and a weakness exploitation prediction module 1209.

The prediction modules 1201 to 1209 predict the occurrence of a cyber threat using a theoretically verified time-series prediction model, such as the Delphi method, which is a method of collecting prediction opinions of experts, as well as the time-series analysis method, based on the history of the occurrence of a cyber threat. Thus, it is possible to predict the occurrence of a cyber threat according to the time-series prediction model in many ways instead of detecting a currently occurring threat in its early stage.

Here, the time-series analysis method is disclosed in "Theory of Time-Series Analysis and Prediction" by Hae-kyeong KIM and Tae-soo KIM, 2003, Kyeongmun Co., the Delphi method is disclosed in "The Delphi Method" by Jong-seong LEE, 2006, Gyoyukgwahak Co., and thus detailed descriptions thereof will be omitted.

More specifically, among the prediction modules 1201 to 1209, the hacking prediction module 1201, the worm/virus prediction module 1202, the DoS attack prediction module 1203, the illegal system access prediction module 1204, the malicious code prediction module 1205, the social engineering attack prediction module 1206 and the system/data falsification prediction module 1207 receive day-specific time-series data stored in the DB management module 111 from the input data generation module 112, and calculate the frequency and dangerousness of the occurrence of a cyber threat using the time-series analysis method.

The time-series analysis method determines a time-series prediction model, e.g., an Autoregressive (AR) model, etc., using time-series data, i.e., variable data on time flow, and such a time-series prediction model is expressed in a formula given below.

$$Y_t = a_1 * Y_{t-2} + a_2 * Y_{t-2} + \ldots + a_n * Y_{t-n} + z$$

In this formula, $Y_t$ denotes a desired value at a point in time t, $Y_{t-1}$ denotes time-series data at a point in time t−1, $Y_{t-2}$ denotes time-series data at a point in time t−2, $a_n$ denotes a coefficient satisfying $a_1 + a_2 + \ldots + a_n = 1$, and z denotes an error term.

Here, time-series data is information on the frequency of the occurrence of a cyber threat denoting, for example, how many worm/virus attacks are made in a day, e.g., 9 on January 1, 11 on January 2, 13 on January 3, . . . , and is processed and stored by the information collection/processing module 10.

When an already-known value t is 2, $a_1$ and $a_2$ are calculated using simultaneous equations $Y_2 = a_1 * Y_1 + a_2 * Y_0$ obtained by inserting 3 time-series data values, e.g., $Y_0$, $Y_1$ and $Y_2$, into the time-series prediction model and $a_1 + a_2 = 1$.

By inserting calculated $a_1$ and $a_2$ and previously stored time-series data values $Y_{t-1}$ and $Y_{t-2}$ into the time-series prediction model ($Y_t = a_1 * Y_{t-1} + a_2 * Y_{t-2} + \ldots + a_n * Y_{t-n} + z$), $Y_t$ is calculated. $Y_t$ calculated in this way becomes a prediction value for the frequency of the occurrence of a cyber threat.

As described above, the frequency $Y_t$ of the occurrence of a cyber threat is predicted. In addition, the dangerousness and possibility of the occurrence are quantified, like the frequency, by the time-series analysis method using time-series data and thereby can be predicted.

In other words, the coefficients $a_1, a_2, \ldots, a_n$ of the time-series prediction model are calculated using time-series data on the past frequency of the occurrence in the time-series prediction model expressed by the time-series analysis method, and the coefficients $a_1, a_2, \ldots, a_n$ are inserted into the time-series prediction model, thereby calculating the prediction value. This is referred to as determination of a time-series prediction model. The time-series data on the past frequency of the occurrence is regressively inserted into the time-series prediction model, and simultaneous equations are solved, thereby obtaining the optimum coefficients $a_1, a_2, \ldots, a_n$.

In particular, the DoS attack prediction module 1203 and the illegal system access prediction module 1204 receive network traffic flow information stored in the DB management module 111 from the input data generation module 112 and predict the dangerousness of the occurrence of a DoS attack using time-series data obtained by periodically calculating, e.g., every 5 minutes or 10 minutes, similarity to the DoS attack. In other words, a network threat is accurately recognized by periodic traffic analysis, e.g., every 5 minutes or 10 minutes, thereby predicting an attack to a network on the basis of the recognition.

Among the prediction modules 1201 to 1209, the cyber terror/war prediction module 1208 and the weakness exploitation prediction module 1209 predict the possibility and time of the occurrence of cyber terror/war and the possibility and time of the occurrence of weakness exploitation on the basis of a non-quantitative characteristic obtained by collecting and processing automatic cyber threat information on the Internet and data obtained by quantifying experts' answers to objective questions.

The respective prediction modules 1201 to 1209 obtain input data from the input data generation module 112 and store prediction results in the DB management module 111 through the prediction result storage module 113.

The result display GUI/management module 110 manages and changes the configurations of the information collection/processing module 10 and the prediction modules 1201 to 1209 of the prediction engine sub-system 120, visualizes the prediction result stored in the DB management module 111 as a graph and text, and provides the graph and text in the form of a GUI.

A method of predicting a cyber threat using the above-described constitution according to an exemplary embodiment of the present invention will be described below with reference to FIGS. 2 and 3.

Figure 2:
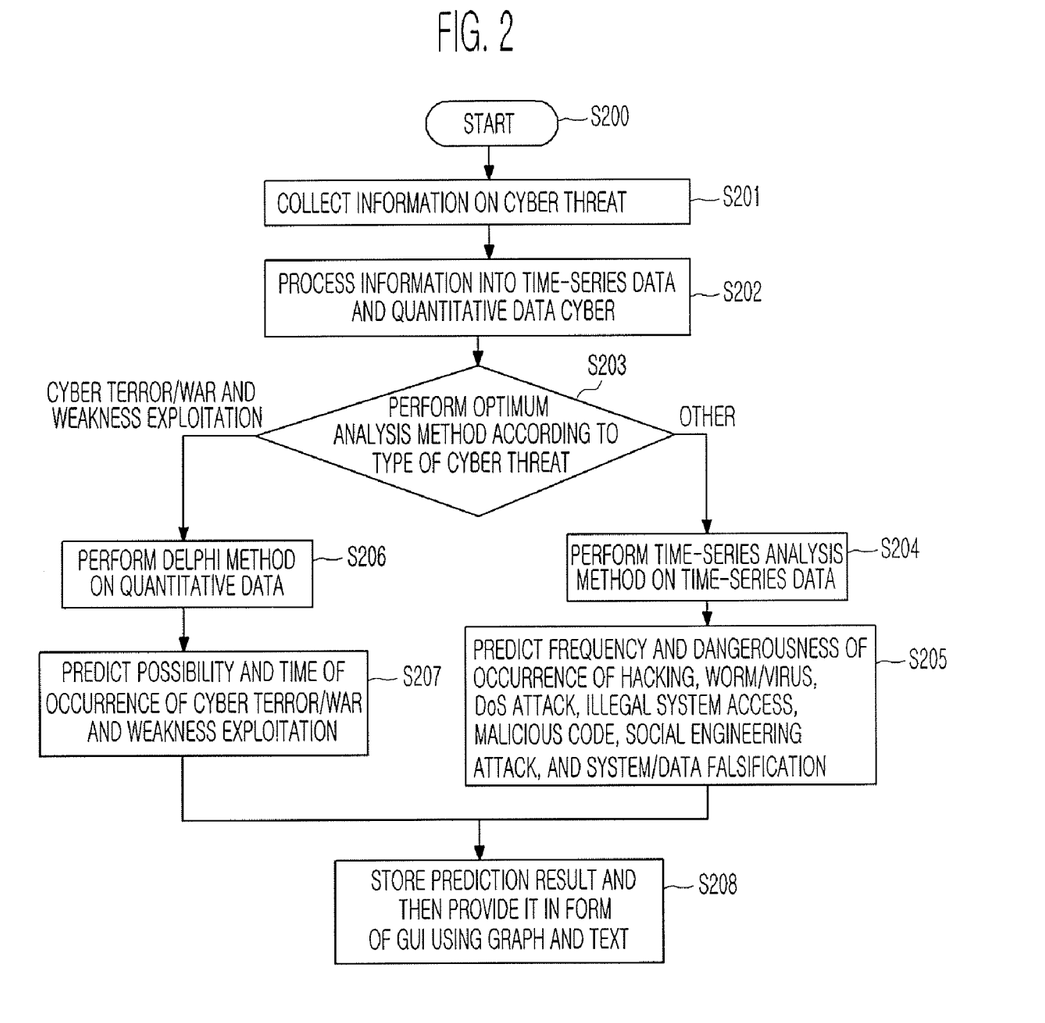
FIG. 2 is a flowchart showing a procedure of predicting and informing a cyber threat to a user in a system for predicting a cyber threat according to an exemplary embodiment of the present invention.

FIG. 2 is a flowchart showing a procedure of predicting and informing the frequency, dangerousness, possibility and time of the occurrence of a cyber threat to a user in the system for predicting a cyber threat according to an exemplary embodiment of the present invention.

Referring to FIG. 2, when the system for predicting a cyber threat starts (step 200), the information collection/processing module 10 collects information on a cyber threat (step 201) and processes the information into time-series data and quantitative data (step 202).

While the information collection/processing module 10 continuously stores processed time-series data and quantitative data in the DB management module 111, the input data generation module 112 reads and transfers the stored time-series data and quantitative data to the prediction engine sub-system 120.

The prediction engine sub-system 120 selects and performs an optimum analysis method according to the type of a cyber threat to be predicted (step 203). First, with respect to a cyber threat, such as hacking, a worm/virus, illegal system access, a DoS attack, a social engineering attack, a malicious code, and system/data falsification, the time-series analysis method is performed on previously stored time-series data (step 204), thereby predicting the frequency and dangerousness of the occurrence of the cyber threat (step 205). The predicted frequency and dangerousness of the occurrence of the cyber threat is stored in the DB management module 111 by the prediction result storage module 113.

When the cyber threat to be predicted is cyber terror/war or weakness exploitation, the Delphi method is performed on the previously stored quantitative data (step 206), thereby predicting the possibility and time of the occurrence of the cyber threat. The prediction result is stored in the DB management module 111 by the prediction result storage module 113 (step 207).

Here, the contents of the most selected answers among data quantified on the basis of experts' answers to an objective question are determined as the possibility and time of the occurrence of cyber terror/war or weakness exploitation among cyber threats.

The prediction result stored in the DB management module 111 is provided in the form of a GUI using a graph and text according to the request of a user (step 208).

Figure 3:
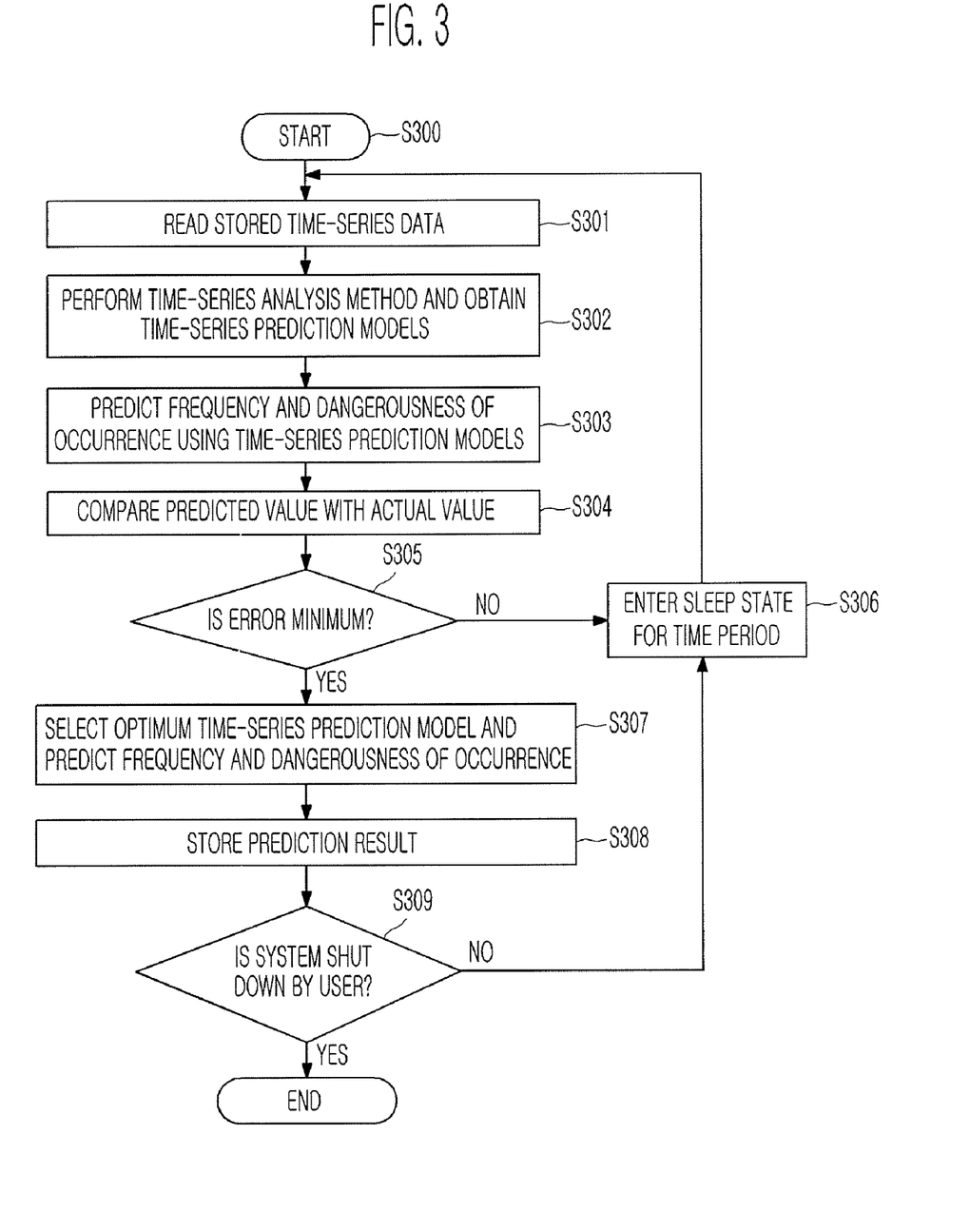
FIG. 3 is a flowchart showing a process of a hacking prediction module, a worm/virus prediction module, a Denial of Service (DoS) attack prediction module, an illegal system access prediction module, a malicious code prediction module, a social engineering attack prediction module, and a system/data falsification prediction module in a prediction engine sub-system according to an exemplary embodiment of the present invention.

FIG. 3 is a flowchart showing a process of the hacking prediction module 1201, the worm/virus prediction module 1202, the DoS attack prediction module 1203, the illegal system access prediction module 1204, the malicious code prediction module 1205, the social engineering attack prediction module 1206, and the system/data falsification prediction module 1207 in the prediction engine sub-system 120 described in FIG. 2 according to an exemplary embodiment of the present invention.

Referring to FIG. 3, the above-described prediction modules 1201 to 1207 read day-specific time-series data on the past frequency of the occurrence of a cyber threat previously stored in the DB management module 111 (step 301). Then, the prediction modules perform the time-series analysis method on the read data to obtain time-series prediction models (step 302), and predict the frequency and dangerousness of the occurrence of a cyber threat using the time-series prediction models (step 303).

Subsequently, when the frequency and dangerousness of a cyber threat actually occurring at a predicted point in time are obtained, errors between the predicted values and the actually obtained values, i.e., errors of prediction results of the frequency and dangerousness of the occurrence according to the time-series prediction models obtained by the time-series analysis method, are calculated. The errors depending on the respective time-series prediction models are compared with each other (step 304), and the minimum error is determined (step 305).

A time-series prediction model corresponding to the minimum error is selected as the optimum time-series prediction model (Y), and the frequency and dangerousness of the occurrence are predicted according to the optimum time-series prediction model (step 307).

The predicted results are stored in the DB management module 111 by the prediction result storage module 113 (step 308). When the system is shut down by a user (Y) (step 309), the system is terminated (step 310). On the other hand, when the system is not shut down (N) (step 309), the system is kept in a sleep state for a time period (step 306). Meanwhile, when the error is not the minimum (N), the system is also kept in the sleep state for a time period (step 306).

The system and method for predicting a cyber threat according to an exemplary embodiment of the present invention predict the occurrence of overall cyber threats posed to a large-scale network and relating to a qualitative characteristic, such as a worm/virus, a DoS attack, and an illegal access, as well as a quantitative characteristic, such as cyber terror/war, and weakness exploitation. Thus, unlike a conventional method of coping with a cyber threat after the cyber threat occurs, such as provision of only network status information on the cyber threat and early warning on the cyber threat, the frequency, dangerousness, possibility and time of the occurrence of a cyber threat are predicted and provided to a user to cope with the cyber threat before the occurrence of the cyber threat. Consequently, it is possible to predict a cyber threat that may occur in the future and support prevention of the cyber threat, thereby minimizing damage from the cyber threat.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. An intrusion detection system for quantifying a value within a low to a high range of values, which allows a user to take appropriate counter measures before a cyber threat occurs, the system comprising:
    a processor and a memory, the memory having stored thereon:
    an information collection-processing module for collecting and processing at least one of information on an intrusion detection event, statistical information on network traffic, cyber threat information of an Internet bulletin board, information from at least one to a plurality of first persons in response to predetermined questions asked related to at least one or more cyber threats,
    wherein the cyber threat information of the internet bulletin board is configured to be automatically collect information from predetermined articles on each of the at least one or more cyber threats from at least two or more predetermined Internet bulletin boards at predetermined time intervals prior to generating the predetermined questions for each of the respective cyber threats;
    a engine sub-system for allowing the user to take the appropriate counter measures before the cyber threat actually occurs by using at least one of a time-series analysis method and a Delphi method according to the collected and processed information;
    a database (DB) management module for storing and managing the collected and processed information of the engine sub-system,
    wherein each of the at least one to the plurality of first persons provide the respective information in response to the questions asked about the cyber threats is represented by a statistical value,
    wherein the statistical value is configured based on quantifying quantitative answers to at least one or more questions received from each of the at least one to the plurality of first persons respective information to generate a degree of the predicted occurrence of the cyber threat before the cyber threat occurs,
    wherein the degree of the quantified quantitative answer ranges from a most selected answer to a least selected answer,
    wherein the engine sub-system applies the time-series analysis of information on the intrusion detection event and the statistical information on network traffic with the generated degree of the quantified quantitative answers ranging from the most selected answer to the least selected answer to generate a value within the range of values for allowing the user to take the appropriate counter measures before the cyber threat occurs,
    wherein a low value indicates a low probability that the cyber threat will occur and a high value indicates a high probability that the cyber threat will occur; and
    a result display graphic user interface (GUI)-management module for displaying the generated value within the range of values for allowing the user to determine whether take the appropriate counter measures before the cyber threat occurs of the engine sub-system on a screen.

2. The system of claim 1, wherein the cyber threat includes at least one of hacking, a worm/virus, a Denial of Service (DoS) attack, illegal system access, a malicious code, a social engineering attack, system/data falsification, cyber terror-war, and exploitation.

3. The system of claim 1, wherein the information collection-processing module comprises:
- a monitoring system DB for storing the intrusion detection event information and the statistical network traffic information;
- an intrusion detection event information processing module for processing and storing time-series data according to day-specific numbers of occurrence of hacking, worm-virus infection, occurrence of a malicious code attack, occurrence of a social engineering attack, occurrence of a system-data falsification attack using the stored intrusion detection event information; and
- a traffic information processing module for storing the time-series data classified according to network flows using the stored statistical network traffic information.

4. The system of claim 3, wherein the information collection-processing module further comprises:
- a statistical network packet information collection module for collecting statistical network packet information on an illegal access and a DoS attack; and
- a network flow information processing module for processing the collected statistical network packet information into network traffic flow information and storing the network traffic flow information.

5. The system of claim 3, wherein the information collection-processing module further comprises:
- an Internet cyber threat information collection module for automatically collecting the respective articles on the cyber threats from the respective predetermined Internet bulletin boards at predetermined time intervals; and
- a non-quantitative information processing module for processing the collected article on the cyber threat into period-specific time-series data and storing the period-specific time-series data.

6. The system of claim 5, wherein the information collection-processing module further comprises:
- an information collection module for collecting each of the at least one to the plurality of first persons respective information obtained as the answers to the at least one or more questions with respect to the cyber threat; and
- an information processing module for quantifying each of the at least one to the plurality of first persons collected respective information, and then calculating and storing a statistically representative value.

7. The system of claim 1, wherein the engine sub-system determines a time-series prediction model corresponding to a minimum error using the time-series analysis method on time-series data stored in the DB management module for allowing the user to determine whether to take the appropriate counter measures before the cyber threat occurs.

8. The system of claim 7, wherein the engine sub-system system comprises at least one of a hacking prediction module, a worm-virus prediction module, a Denial of Service (DoS) attack prediction module, an illegal system access prediction module, a malicious code prediction module, a social engineering attack prediction module, and a system-data falsification prediction module for allowing the user to determine whether to take the appropriate counter measures before the cyber threat occurs.

9. The system of claim 8, wherein the DoS attack prediction module calculates a network traffic flow entropy similarity of a DoS attack using network traffic flow information stored in the DB management module, stores the network traffic flow entropy similarity as time-series data, and predicts occurrence of a DoS attack using the stored time-series data for allowing the user to determine whether to take the appropriate counter measures before the cyber threat from the Dos attack occurs.

10. The system of claim 1, wherein the engine sub-system synthesizes the information of each of the at least one to the plurality of first persons using a Delphi method on the information stored in the DB management module for allowing the user to determine whether to take the appropriate counter measures before the cyber threat occurs.

11. The system of claim 10, wherein the engine sub-system comprises:
- a cyber terror-war module and a weakness exploitation module for respectively predicting occurrence of cyber terror-war and exploitation on the basis of the most selected answer using information obtained by quantifying and storing each of the at least one to the plurality of first persons collected information as the answers to the at least one or more questions for allowing the user to determine whether to take the appropriate counter measures before the cyber threat from the cyber terror-war and exploitation occurring.

12. The system of claim 1, wherein the result display GUI-management module provides the stored value result for allowing the user to determine whether to take the appropriate counter measures before the cyber threat occurs, which is done in a form of a GUI using a graph and text.

13. A method of providing information on a cyber threat comprising at least one of hacking, a worm/virus, a Denial of Service (DoS) attack, illegal system access, a malicious code, a social engineering attack, system/data falsification, cyber terror/war, and exploitation for quantifying a value within a low to a high range of values, which allows a user to take appropriate counter measures before the cyber threat occurs, the method comprising the steps of:
- providing a processor and a memory, the memory having stored thereon:
- (a) collecting cyber threat information,
  wherein the cyber threat information comprises at least one of information on an intrusion detection event, statistical information on network traffic, statistical information on a network packet, cyber threat information of an Internet bulletin board, and information from each of at least one to a plurality of first persons that predicts occurrence of the cyber threat;
- (b) processing the collected cyber threat information into time-series data and quantitative data, and storing the time-series data and the quantitative data;
- (c) providing information for predicting occurrence of the cyber threat before the cyber threat actually occurs by using at least one of a time-series models and a Delphi method according to a type of the cyber threat,
  wherein each of at least one to a plurality of first persons provide the respective information for predicting occurrence of the cyber threat before the cyber threat occurs,
  wherein each of the at least one to the plurality of first persons respective information for predicting occurrence of the cyber threat before the cyber threat occurs is represented by a statistical value,
  wherein the statistical value is based on quantifying quantitative answers to at least one or more questions received from each of the at least one to the plurality of first persons respective information to generate a degree of the occurrence of the cyber threat before the cyber threat actually occurs,
  wherein the questions are automatically generated from a user's defined internet boards prior to generating the one or more questions, where the internet boards are selected based on the type of cyber threat, wherein the degree of the quantified quantitative answer ranges from a most selected answer to a least selected answer, wherein the providing information on the occurrence of the cyber threat applies the time-series analysis of information on the intrusion detection event and the statistical information on network traffic with the generated degree of the quantified quantitative answers ranging from the most selected answer to the least selected answer to generate a value within the range of values for allowing the user to take the appropriate counter measures before the cyber threat occurs, wherein a low value indicates a low probability that the cyber threat will actually occur and a high value indicates a high probability that the cyber threat will occur; and (d) storing the generated value within the range of values for allowing the user to determine whether take the appropriate counter measures before the cyber threat occurs and providing the generated value within the range of values for allowing the user to determine whether take the appropriate counter measures before the cyber threat occurs by using a graph or text according to the user's request.

14. The method of claim 13, wherein the cyber threat information of step (a) includes at least one of information on an intrusion detection event, statistical information on network traffic, statistical information on a network packet, cyber threat information of an Internet bulletin board, and information of information security experts.

15. The method of claim 14, wherein in step (b), the statistical network traffic information and the statistical network packet information are processed in a form of a traffic flow (a source IP (Internet protocol) address, a destination IP address, a source port, a destination port, a number of packets, and an amount of the packets), worm-virus information of the Internet bulletin board is processed in a form of a worm/virus table, and the information of information security experts is processed in a form of a database (DB) expert information table.

16. The method of claim 13, wherein step (c) comprises the steps of:

(c1) when the type of the cyber threat is hacking, a worm/virus, a DoS attack, illegal system access, a malicious code, a social engineering attack, or system/data falsification, performing the time-series analysis method using the stored time-series data and thereby obtaining time-series prediction models;

(c2) analyzing the time-series prediction models and selecting a time-series prediction model corresponding to a minimum error; and (c3) predicting the frequency and the occurrence of the cyber threat using the time-series prediction model.

17. The method of claim 16, wherein in step (c1), previously stored time-series data on a past frequency of the occurrence of the cyber threat is inserted into a time-series prediction model as a formula below, which is obtained by the time-series analysis method, to calculate coefficients $a_1, a_2, \ldots, a_n$ of the time-series prediction model, the calculated coefficients $a_1, a_2, \ldots, a_n$ are inserted into the formula below, and thereby the time-series prediction models are obtained, $$Y_t = a_1 * Y_{t-1} + a_2 * Y_{t-2} + \ldots + a_n * Y_{t-n} + z$$

wherein $Y_t$ denotes a desired value at a point in time t, $Y_{t-1}$ denotes time-series data at a point in time t-1, $Y_{t-2}$ denotes time-series data at a point in time t-2, $a_n$ denotes a coefficient satisfying $a_1 + a_2 + \ldots + a_n = 1$, and z denotes an error term.

18. The method of claim 16, wherein step (c2) comprises the steps of:

predicting the frequency of the occurrence of the cyber threat using the obtained time-series prediction models;

calculating an error between the predicted frequency and an actual frequency; and selecting the time-series prediction model corresponding to the minimum error.

19. The method of claim 14, wherein in step (c), when the type of the cyber threat is cyber terror-war or exploitation, the Delphi method is performed on data obtained by quantifying the cyber threat from the at least one to the plurality of first persons respective information collected using the at least one to the plurality of questions and a time of at least one of the occurrence of the cyber terror-war and the exploitation before the cyber terror-war and the exploitation occurs are predicted on the basis of the most selected answer.

20. An intrusion detection system for quantifying a value within a low to a high range of values, which allows a user to take appropriate counter measures before a cyber threat occurs, the system comprising:

a processor and a memory, the memory having stored thereon:

an information collection-processing module for collecting and processing at least one of information on an intrusion detection event, statistical information on network traffic, cyber threat information of an Internet bulletin board, information from at least one to a plurality of first persons that predicts occurrence of the cyber threat before the cyber threat occurs;

a engine sub-system for allowing the user to take the appropriate counter measures before the cyber threat occurs by using at least one of a time-series analysis method and a Delphi method according to the collected and processed information:

a database (DB) management module for storing and managing the collected and processed information of the engine sub-system, wherein each of the at least one to the plurality of first persons provide the respective information that predicts occurrence of the cyber threat before the cyber threat occurs, wherein each of the at least one to the plurality of first persons respective information that predicts occurrence of the cyber threat before the cyber threat occurs is represented by a statistical value, wherein the statistical value is based on quantifying quantitative answers to at least one or more questions received from each of the at least one to the plurality of first persons respective opinion information on a degree of the occurrence of the cyber threat; and wherein the statistical value is configured based on quantifying quantitative answers to at least one or more questions received from each of the at least one to the plurality of first persons respective information to generate a degree of the predicted occurrence of the cyber threat before the cyber threat occurs, wherein the degree of the quantified quantitative answer ranges from a most selected answer to a least selected answer, wherein the questions are automatically generated from a user's defined internet boards prior to generating the one or more questions, wherein each of the at least one to the plurality of first persons respective information that predicts occurrence of the cyber threat are pre-selected by the user in advance of receiving the questions, wherein the pre-selected first persons are selected by the user according the pre-selected first persons' expertise in the cyber threat, and where the internet boards are selected based on the cyber threat, a result display graphic user interface (GUI)-management module for displaying the prediction result of the prediction engine sub-system on a screen of the prediction of the frequency and time of the occurrence of the cyber threat at a future time in order for a user to prepare against the cyber threat to minimize damage from the cyber threat, and changing and managing configurations of the prediction engine sub-system and the information collection-processing module.

* * * * *